US008775035B2

(12) United States Patent
Sherlock et al.

(10) Patent No.: US 8,775,035 B2
(45) Date of Patent: Jul. 8, 2014

(54) HYDRAULIC MANAGEMENT SYSTEM AND METHOD BASED ON AUXILIARY WORK TOOL USAGE

(71) Applicant: Deere & Company, Moline, IL (US)

(72) Inventors: Lance R. Sherlock, Asbury, IA (US); Richard Pugh, Dubuque, IA (US); Kristen D. Cadman, Dubuque, IA (US)

(73) Assignee: Deere & Company, Moline, IL (US)

( * ) Notice: Subject to any disclaimer, the term of this patent is extended or adjusted under 35 U.S.C. 154(b) by 29 days.

(21) Appl. No.: 13/692,435

(22) Filed: Dec. 3, 2012

(65) Prior Publication Data

US 2014/0150304 A1 Jun. 5, 2014

(51) Int. Cl.
*G01M 17/00* (2006.01)
*G06F 19/00* (2011.01)

(52) U.S. Cl.
USPC .......................................... 701/50; 701/29.4

(58) Field of Classification Search
CPC .. F01M 2011/14; G07C 5/006; E02F 9/2025; E02F 9/26
See application file for complete search history.

(56) References Cited

U.S. PATENT DOCUMENTS

| | | | | |
|---|---|---|---|---|
| 5,809,779 | A | 9/1998 | Bruso | |
| 5,970,436 | A | 10/1999 | Berg et al. | |
| 7,493,112 | B2 | 2/2009 | Adachi et al. | |
| 8,160,784 | B2 * | 4/2012 | Fukumoto | 701/50 |
| 2003/0051470 | A1 * | 3/2003 | Maddock | 60/368 |
| 2006/0129280 | A1 * | 6/2006 | Thomas et al. | 700/275 |
| 2006/0150446 | A1 | 7/2006 | Ottoni | |
| 2007/0222573 | A1 * | 9/2007 | Navarro et al. | 340/457.4 |
| 2009/0198409 | A1 * | 8/2009 | Rector et al. | 701/35 |
| 2010/0087985 | A1 * | 4/2010 | Boss et al. | 701/35 |
| 2010/0275589 | A1 | 11/2010 | Meyers et al. | |
| 2011/0137491 | A1 * | 6/2011 | Self et al. | 701/2 |
| 2012/0250815 | A1 | 10/2012 | Oksman et al. | |

* cited by examiner

*Primary Examiner* — Michael J Zanelli
(74) *Attorney, Agent, or Firm* — Faegre Baker Daniels LLP

(57) ABSTRACT

A hydraulic management system and method are provided that account for auxiliary work tool usage. The hydraulic management system automatically calculates an effective use time of a hydraulic element, such as a hydraulic fluid or hydraulic filters, by multiplying work tool usage by a desired gain factor, where the gain factor may exceed 1 for auxiliary work tools.

22 Claims, 3 Drawing Sheets

HYDRAULIC MANAGEMENT SYSTEM AND METHOD BASED ON AUXILIARY WORK TOOL USAGE

FIELD

The present disclosure relates to a hydraulic management system and method for a work vehicle. More particularly, the present disclosure relates to a hydraulic management system and method for a work vehicle that accounts for auxiliary work tool usage.

BACKGROUND

A work vehicle may be configured to receive a primary work tool, such as a bucket, as well as one or more auxiliary work tools. Compared to the primary work tool, the auxiliary work tool may allow more dirt and debris to enter the hydraulic fluid (e.g., oil) of the vehicle. As a result, the hydraulic fluid in the vehicle may become contaminated faster when operating an auxiliary work tool than when operating a primary work tool. The filters used to clean the contaminated hydraulic fluid may also become clogged faster when operating an auxiliary work tool than when operating a primary work tool. Therefore, the hydraulic fluid and the hydraulic filters may require more frequent maintenance when operating an auxiliary work tool than when operating a primary work tool. In practice, it becomes difficult to anticipate and schedule downtime to perform such maintenance.

SUMMARY

The present disclosure provides a hydraulic management system and method that account for auxiliary work tool usage. The hydraulic management system automatically calculates an effective use time of a hydraulic element, such as a hydraulic fluid or hydraulic filters, by multiplying work tool usage by a desired gain factor, where the gain factor may exceed 1 for auxiliary work tools.

According to an embodiment of the present disclosure, a work vehicle is provided including a chassis, a plurality of traction devices supporting the chassis, a first hydraulic work tool selectively coupled to the work vehicle for movement relative to the chassis, a second hydraulic work tool selectively coupled to the work vehicle for movement relative to the chassis, and a hydraulic management system including a controller that determines an effective use time of at least one hydraulic element of the work vehicle. The controller increases the effective use time at a first rate based on usage of the first hydraulic work tool and at a second rate based on usage of the second hydraulic work tool, the second rate differing from the first rate.

According to another embodiment of the present disclosure, a work vehicle is provided including a chassis, a plurality of traction devices supporting the chassis, at least one hydraulic work tool selectively coupled to the work vehicle for movement relative to the chassis, a hydraulic management system including a controller and a gain input that communicates a gain factor associated with the at least one hydraulic work tool to the controller. The controller multiplies usage of the at least one hydraulic work tool by the gain factor to determine an effective use time of at least one hydraulic element of the work vehicle.

According to yet another embodiment of the present disclosure, a method is provided for managing a hydraulic system of a work vehicle. The method includes the steps of: receiving a gain factor associated with a hydraulic work tool; operating the work vehicle with the hydraulic work tool coupled to the work vehicle; monitoring an actual time of the operating step; and determining an effective use time of at least one hydraulic element of the work vehicle by multiplying the actual time of the operating step by the gain factor.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

Figure 1:
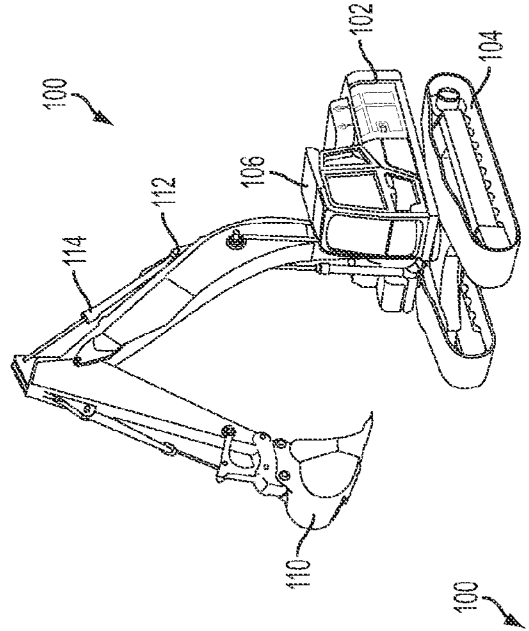
FIG. 1 is a perspective view of an excavator including a primary bucket on a boom assembly.

Referring initially to FIG. 1, a work vehicle 100 is provided in the form of an excavator. Although vehicle 100 is illustrated and described herein as an excavator, vehicle 100 may also be in the form of a loader, a bulldozer, a motor grader, or another construction, agricultural, or utility vehicle, for example. Vehicle 100 includes chassis 102 and a plurality of traction devices 104 that support and propel chassis 102 across the ground. In FIG. 1, traction devices 104 are in the form of tracks, but it is also within the scope of the present disclosure that traction devices 104 may be in the form of wheels, for example. Vehicle 100 also includes an operator cab 106 supported by chassis 102 to house and protect the operator of vehicle 100.

Vehicle 100 further includes a primary hydraulic work tool, illustratively a bucket 110, that is moveably coupled to chassis 102 via boom assembly 112. The primary bucket 110 may be configured to dig, scoop, carry, and dump dirt and other materials. A plurality of hydraulic cylinders 114 may be provided to move boom assembly 112, as well as the primary bucket 110 located thereon, relative to chassis 102. The primary bucket 110 may be installed and sold by the original equipment manufacturer (OEM).

Figure 2A:
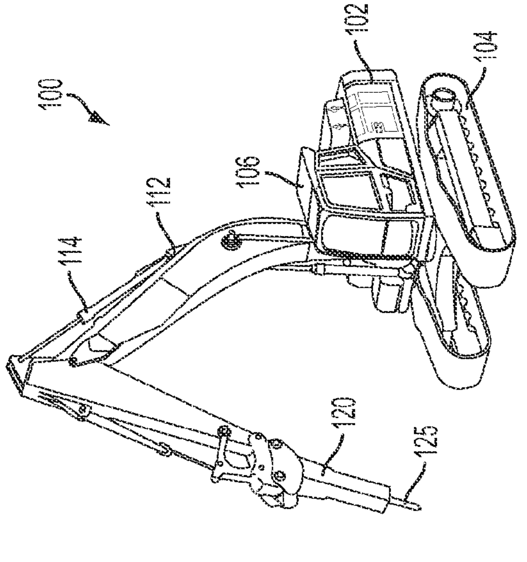
FIG. 2A is a perspective view of the excavator of FIG. 1 including a secondary hammer on the boom assembly instead of the primary bucket.
Figure 2B:
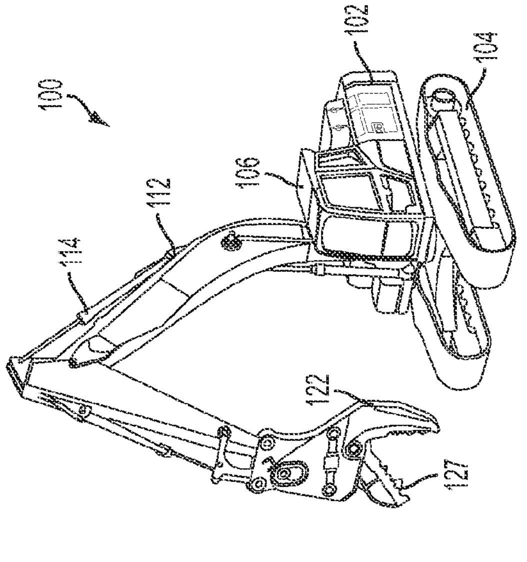
FIG. 2B is a perspective view of the excavator of FIG. 1 including a pair of secondary shears on the boom assembly instead of the primary bucket.

Vehicle 100 is also configured to receive one or more secondary or auxiliary hydraulic work tools. The primary bucket 110 (FIG. 1) may be separated from boom assembly 112 to accommodate a desired secondary work tool thereon. In FIG. 2A, a secondary work tool is shown in the form of a hydraulic hammer 120 with a tip 125 that oscillates to break up stone, concrete, and other materials. In FIG. 2B, another secondary work tool is shown in the form of hydraulic shears 122 with arms 127 that open and close like scissors to cut metal and other hard materials. Other suitable secondary work tools for use with vehicle 100 include augers, compactors, grapples, rakes, and wood splitters, for example. Secondary work tools may be obtained as aftermarket components and may be purchased for long-term use and/or leased for short-term use.

The secondary hammer 120 and the secondary shears 122, like the primary bucket 110, may be moveably coupled to chassis 102 via boom assembly 112. The same hydraulic cylinders 114 that were used to operate boom assembly 112 with the primary bucket 110 in place may be used to operate boom assembly 112 with the secondary hammer 120 or the secondary shears 122 in place. Additional hydraulic actuators may also be provided to operate auxiliary functions of the secondary work tools 120, 122. In the case of the secondary hammer 120, for example, an additional hydraulic cylinder 124 (shown in phantom in FIG. 3) may be provided to oscillate tip 125. The additional cylinder 124 may be a single-acting (i.e., 1-way) cylinder. In the case of the secondary shears 122, an additional hydraulic cylinder 126 (shown in phantom in FIG. 3) may be provided to open and close arms 127. The additional cylinder 126 may be a double-acting (i.e., 2-way) cylinder.

Figure 3:
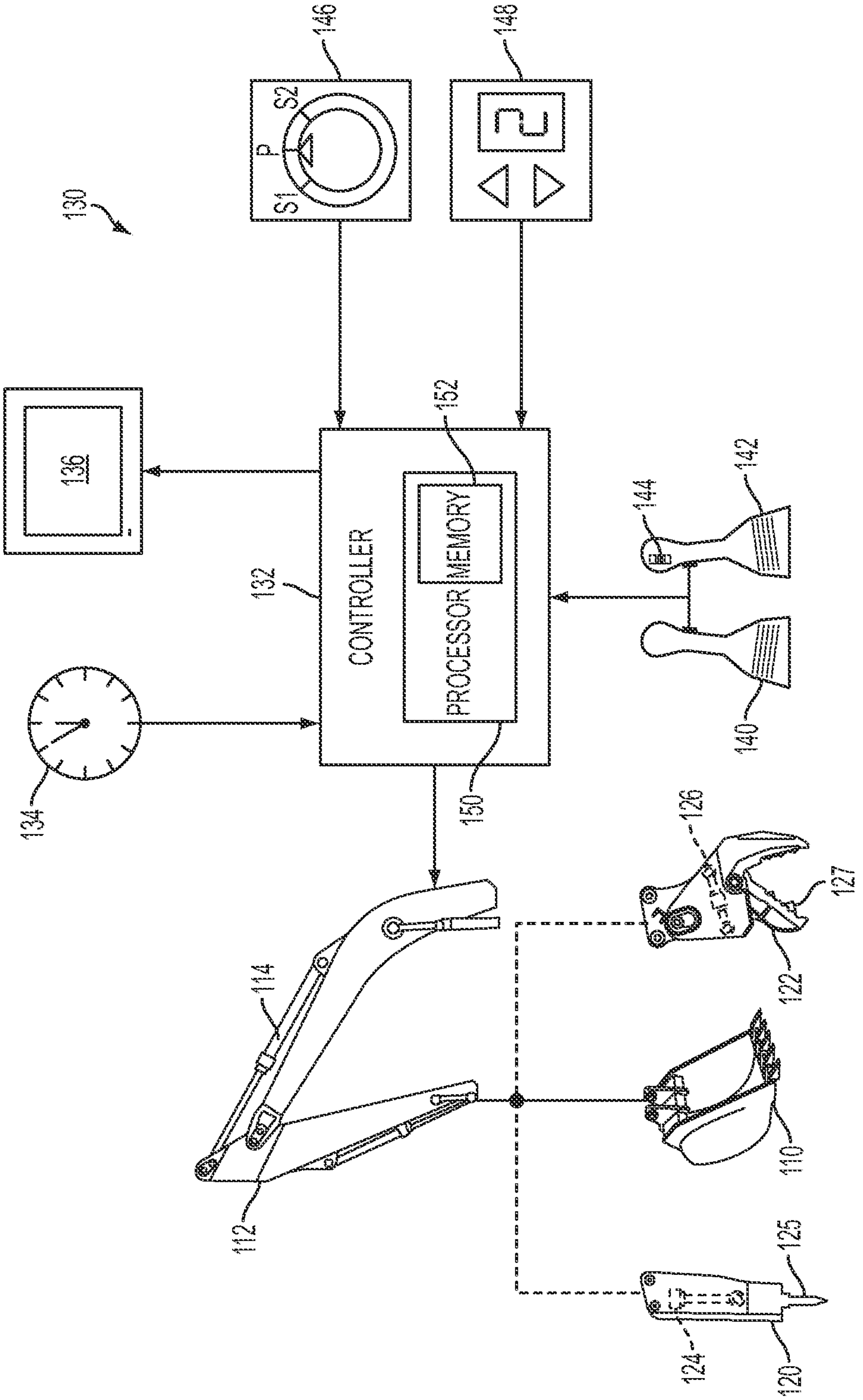
FIG. 3 is a schematic diagram of an exemplary hydraulic management system of the present disclosure.

Referring next to FIG. 3, a hydraulic management system 130 is provided for vehicle 100. The illustrative hydraulic management system 130 includes a controller 132, a timer 134, a monitor or display 136, a plurality of tool operation inputs 140, 142, 144, a tool selector input 146, and a gain input 148. Display 136, tool operation inputs 140, 142, 144, tool selector input 146, and gain input 148 may be located inside operator cab 106 of vehicle 100 (FIG. 1) to allow for visibility and access by the operator. It is within the scope of the present disclosure that one or more components of the hydraulic management system 130 may be combined. For example, tool selector input 146 and gain input 148 may be incorporated as push-buttons into display 136. Individual components of the hydraulic management system 130 are described further below.

Controller 132 may include a processor 150 that is capable of receiving inputs and generating appropriate outputs and a memory 152 that is capable of storing information. The components of hydraulic management system 130 may communicate with controller 132 via a CAN network or via wired connections, for example. The operation of controller 132 is discussed further below with reference to FIG. 4.

Timer 134 may operate whenever vehicle 100 is powered on, even when the operator is not operating a hydraulic work tool. It is also within the scope of the present disclosure that timer 134 may operate only during hydraulic operations of vehicle 100, such as during operation of a hydraulic work tool. Controller 132 is able to monitor timer 134 to determine the start time of an event and the end time of the event, for example.

The tool operation inputs, illustratively a left joystick 140, a right joystick 142, and a slider 144 mounted on the right joystick 142, allow the operator to control the movement of boom assembly 112 and the desired work tool 110, 120, 122. When the operator moves left and/or right joysticks 140, 142, controller 132 may control the movement of boom assembly 112 via hydraulic cylinders 114, for example. When the operator moves slider 144, controller 132 may control an auxiliary work tool function. For example, controller 132 may control the movement of tip 125 of hammer 120 via hydraulic cylinder 124, or the movement of arms 127 of shears 122 via hydraulic cylinder 126. The type, number, and arrangement of tool operation inputs 140, 142, 144 may vary. For example, a foot pedal (not shown) may be used instead of the illustrative slider 144. Also, additional joysticks, sliders, or other user inputs may be provided to control additional work tools and work tool functions.

Tool selector input 146 allows the operator to inform controller 132 which work tool has been selected for use on vehicle 100. The illustrative tool selector input 146 of FIG. 3 may be used to identify a primary work tool "P" (e.g., the primary bucket 110), a secondary work tool having single-acting (i.e., 1-way) hydraulics "S1" (e.g., the secondary hammer 120), or a secondary work tool having double-acting (i.e., 2-way) hydraulics "S2" (e.g., the secondary shears 122). Tool selector input 146 may be in the form of a switch, a dial, a multi-option menu, or another suitable user input. In an exemplary embodiment, display 136 visually communicates the current tool selection to the operator, such as with an icon.

Gain input 148 allows the operator to input a desired gain factor into controller 132. In an exemplary embodiment, the gain factor is a number greater than or equal to 1, such as 1, 2, 3, 4, 5, or more. Other numerical values are also within the scope of the present disclosure. The gain factor may default to 2 or 3, for example, unless changed by the operator. Gain input 148 may be in the form of a numerical key pad, up and down selector buttons, a dial, a multi-option menu, or another suitable user input. In an exemplary embodiment, display 136 visually communicates the current gain factor to the operator. Gain input 148 may be enabled when tool selector input 146 identifies a secondary work tool "S1" or "S2," allowing the operator to input a corresponding gain factor (e.g., 1, 2, 3, 4, 5, or more) to controller 132. However, gain input 148 may be disabled to the operator when tool selector input 146 identifies a primary work tool "P," automatically supplying a gain factor of 1 to controller 132.

In operation, vehicle 100 delivers hydraulic fluid to operate the selected work tool. For example, vehicle 100 may deliver hydraulic fluid to the hydraulic cylinders 114 of boom assembly 112, the hydraulic cylinder 124 of the secondary hammer 120, and/or the hydraulic cylinder 126 of the secondary shears 122. Compared to a primary work tool (e.g., the primary bucket 110), a secondary work tool (e.g., the secondary hammer 120, the secondary shears 122) may allow more dirt and debris to enter the hydraulic fluid of vehicle 100. As a result, the hydraulic fluid in vehicle 100 may become contaminated faster when operating a secondary work tool than when operating a primary work tool. The filters used to clean the contaminated hydraulic fluid may also become clogged faster when operating a secondary work tool than when operating a primary work tool. Therefore, the hydraulic fluid, the hydraulic filters, and/or other hydraulic elements of vehicle 100 may require more frequent maintenance when operating a secondary work tool than when operating a primary work tool.

Various characteristics of the secondary work tool may influence the cleanliness/dirtiness of the hydraulic system. Such characteristics include, for example, the type of secondary work tool, the age and condition of the secondary work tool and its hydraulic seals, the quality of the hydraulic coupling between the secondary work tool and vehicle 100 (FIG. 1), the nature of the surrounding work environment, the nature of any auxiliary function performed by the secondary work tool, and other characteristics. For example, a secondary hammer 120 that will be oscillated in the ground to break up material may pick up more dirt and debris than secondary shears 122 that will be operated away from the ground. As another example, an old or poorly-maintained secondary work tool may pick up more dirt and debris than a new or well-maintained secondary work tool.

Hydraulic management system 130 of the present disclosure may automatically account for the increased dirtiness and frequent maintenance associated with secondary work tools when calculating the usage of the hydraulic fluid, the hydraulic filters, and/or other hydraulic elements of vehicle 100. For each hydraulic element, hydraulic management system 130 may automatically calculate an effective use time (i.e., time of operation) of the hydraulic element by multiplying work tool usage by a desired gain factor, according to Formula (I) below.

$$\text{Effective Use Time} = G_P(T_P) + G_{S1}(T_{S1}) + G_{S2}(T_{S2}) \quad \text{(I)}$$

wherein:

- $T_P$=the actual time of operation with a primary work tool
- $G_P$=the gain factor associated with the primary work tool
- $T_{S1}$=the actual time of operation with a single-acting secondary work tool
- $G_{S1}$=the gain factor associated with the single-acting secondary work tool
- $T_{S2}$=the actual time of operation with a double-acting secondary work tool
- $G_{S2}$=the gain factor associated with the double-acting secondary work tool For a primary work tool, the gain factor ($G_P$) is generally equal to 1. In operation, gain input 148 may automatically supply a gain factor ($G_P$) of 1 to controller 132. With primary work tool usage, the effective use time of the hydraulic element may be the same as the actual use time of the hydraulic element.

For secondary work tools, the gain factor ($G_{S1}$ and $G_{S2}$) may be greater than 1. In operation, the operator may use gain input 148 to manually specify an appropriate gain factor ($G_{S1}$ and $G_{S2}$) to controller 132 based on one or more characteristics of the secondary work tool, which are discussed above. It is also within the scope of the present disclosure for controller 132 to automatically determine an appropriate gain factor based on the type of secondary work tool selected for use and/or other characteristics of the work tool. In this embodiment, secondary work tool usage will increase the effective use time of a hydraulic element at a faster rate than primary work tool usage. Secondary work tool usage may also cause the effective use time of the hydraulic element to exceed the actual use time of the hydraulic element. As a result, the operator will know to conduct more frequent maintenance of the hydraulic element with secondary work tool usage.

For each hydraulic element, the effective use time from Formula (I) above may be used to calculate the spent life of the hydraulic element. The spent life may be expressed as a fraction or percentage of a predetermined expected life, according to Formula (II) below. The spent life may be communicated to the operator to warn the operator of an immediate or future need for maintenance. For example, when the spent life of a hydraulic element reaches 70%, 80%, 90%, or more, controller 132 may issue warning notifications to the operator via display 136 or another suitable communication device. When the spent life reaches 100%, the warning notifications from controller 132 may become more intense, such as by flashing text on display 136 or by issuing an audible signal.

$$\text{Spent Life} = \frac{\text{Effective Use Time}}{\text{Expected Life}} * 100\% \quad \text{(II)}$$

Also, the effective use time from Formula (I) above may be used to calculate the remaining life of each hydraulic element. The remaining life may be expressed as a fraction or percentage of the expected life, according to Formula (III) below. Again, the remaining life may be communicated to the operator to warn the operator of an immediate or future need for maintenance. For example, when the remaining life of a hydraulic element reaches 30%, 20%, 10%, or less, controller 132 may issue warning notifications to the operator via display 136 or another suitable communication device. When the remaining life reaches 0%, the warning notifications from controller 132 may become more intense, such as by flashing text on display 136 or by issuing an audible signal.

$$\text{Remaining Life} = \frac{(\text{Expected Life} - \text{Effective Use Time})}{\text{Expected Life}} * 100\% \quad \text{(III)}$$

The effective use time of Formula (I) above may be reset to 0 hours after performing an appropriate maintenance procedure, such as an oil change or a filter change. As a result, the spent life of Formula (II) above will be reset to 0% and the remaining life of Formula (III) above will be reset to 100%.

The following scenario is presented to illustrate the calculations discussed above. Since the last hydraulic oil change was performed, the operator in the present example operates a vehicle with a primary bucket for 400 hours ($T_P$), a single-acting secondary hammer for 100 hours ($T_{S1}$), and double-acting secondary shears for 100 hours ($T_{S2}$). The gain factor for the primary bucket ($G_P$) is automatically set to 1. The operator designates a gain factor for the secondary hammer ($G_{S1}$) of 5, because the secondary hammer is old, poorly maintained, and used in a dirty environment. The operator designates a gain factor for the secondary shears ($G_{S2}$) of 2, because the secondary shears are relatively new and in good condition. Although the hydraulic oil has an actual use time of only 600 hours (calculated as 400 hours with the primary bucket+100 hours with the secondary hammer+100 hours with the secondary shears), the hydraulic oil has an effective use time of 1,100 hours (calculated as 1*400 hours with the primary bucket+5*100 hours with the secondary hammer+2*100 hours with the secondary shears) according to Formula (I) above. Assuming that the hydraulic oil has a predetermined expected life of 2,000 hours, the hydraulic oil life is 55% spent based on Formula (II) above with 45% remaining based on Formula (III) above after 1,100 hours of effective operation.

Figure 4:
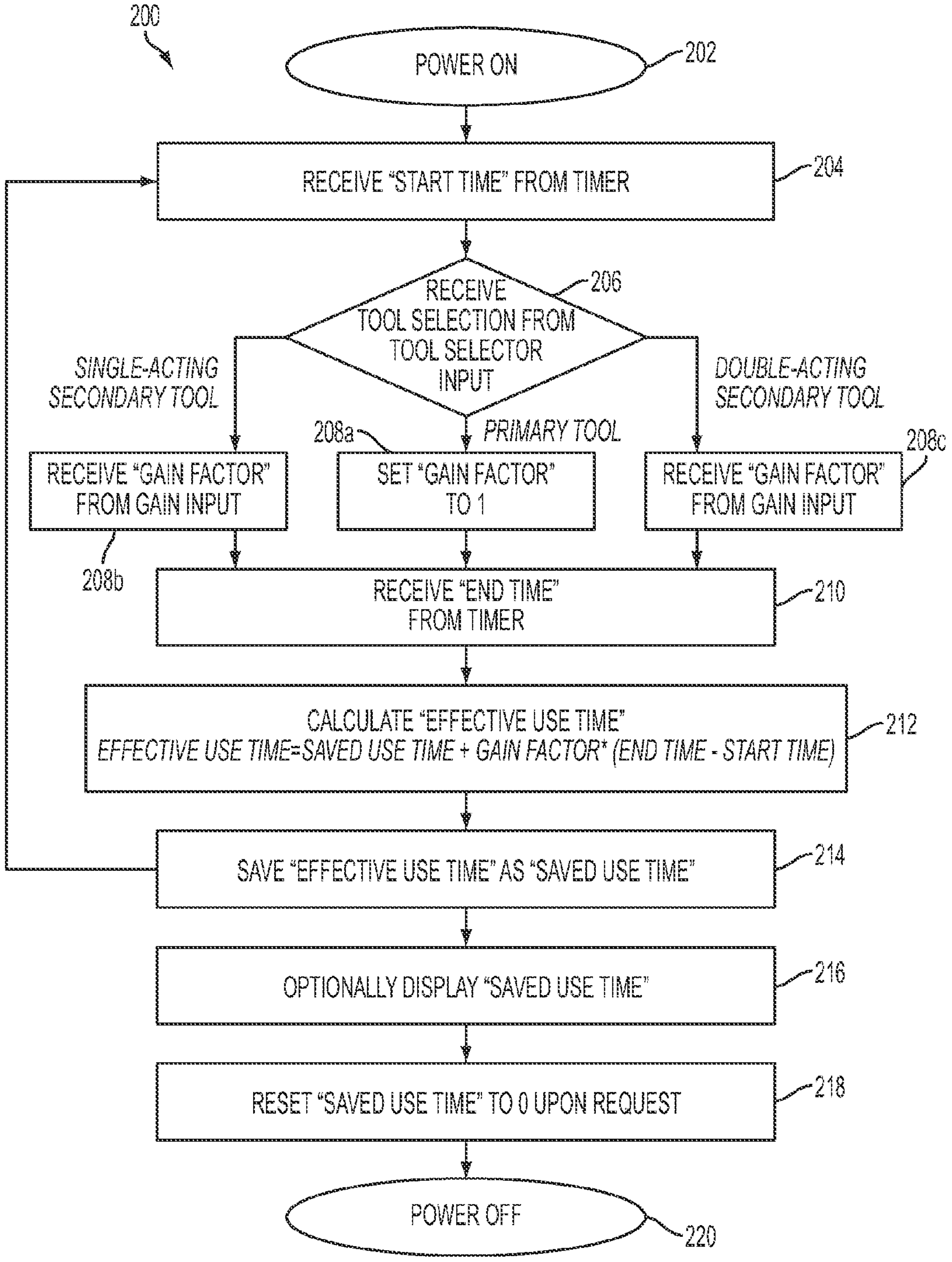
FIG. 4 is a flow chart illustrating an exemplary method of the present disclosure.

An exemplary method 200 for operating hydraulic management system 130 is shown in FIG. 4. Method 200 may be performed for each hydraulic element of vehicle 100 (FIG. 1), such as hydraulic fluid and hydraulic filters.

In step 202 of FIG. 4, the operator powers on vehicle 100 (FIG. 1), which may cause timer 134 (FIG. 3) to begin running. Controller 132 communicates with timer 134 (FIG. 3) in step 204 to receive a "Start Time" value, which may be recorded into memory 152.

In step 206, controller 132 communicates with tool selector input 146 (FIG. 3) to identify a primary work tool (e.g., the primary bucket 110), a single-acting secondary work tool (e.g., the secondary hammer 120), or a double-acting secondary work tool (e.g., the secondary shears 122), for example. If the tool selector input 146 identifies a primary work tool in the identification step 206, method 200 continues to step 208*a*, in which the "Gain Factor" value is automatically set to 1 in this embodiment. If the tool selector input 146 identifies a single-acting secondary work tool or a double-acting secondary work tool in the identification step 206, method 200 continues to the corresponding step 208*b* or 208*c*, in which the "Gain Factor" value is specified by the operator via gain input 148 (FIG. 3).

Continuing to step 210, controller 132 communicates with timer 134 (FIG. 3) to receive an "End Time" value, which may also be recorded into memory 152. In step 212, controller 132 uses the above-described "Start Time," "End Time," and "Gain Factor" values, and any "Saved Use Time" from memory 152, to calculate an "Effective Use Time" for the hydraulic element. The "Effective Use Time" calculated in step 210 may be saved to memory 152 in step 212 as the "Saved Use Time," overwriting any previously-saved "Saved Use Time." The above-described steps 202-212 of method 200 may be repeated until vehicle 100 (FIG. 1) is eventually powered off in step 220.

Method 200 also includes step 214, which allows for displaying the "Saved Use Time" to the operator via display 136 (FIG. 3) or another suitable communication device. The "Saved Use Time" may be displayed in units of hours (See, e.g., Formula (I) above) or as a fraction or percentage of the hydraulic element's expected life (See, e.g., Formulas (II) and (III) above). The expected life may be stored in memory 152. The displaying step 214 may be performed in response to a manual request by the operator. The displaying step 214 may also be performed automatically when the "Saved Use Time" reaches a threshold value that is indicative of the hydraulic element approaching or reaching the end of its expected life.

Method 200 further includes step 216, which allows for resetting the "Saved Use Time" upon request. The resetting step 216 may be performed after the operator performs an appropriate maintenance procedure, such as an oil change or a filter change.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A work vehicle including:

a chassis;

a plurality of traction devices supporting the chassis;

a first hydraulic work tool selectively coupled to the work vehicle for movement relative to the chassis;

a second hydraulic work tool selectively coupled to the work vehicle for movement relative to the chassis; and a hydraulic management system including a controller that determines an effective use time of at least one hydraulic element of the work vehicle, the controller increasing the effective use time at a first rate based on usage of the first hydraulic work tool and at a second rate based on usage of the second hydraulic work tool, the second rate differing from the first rate.

2. The work vehicle of claim 1, wherein the first rate is 1 and the second rate is greater than 1.

3. The work vehicle of claim 1, wherein the second rate is less than or equal to 5.

4. The work vehicle of claim 1, wherein the controller compares the effective use time of the at least one hydraulic element to a predetermined expected life of the at least one hydraulic element.

5. The work vehicle of claim 1, wherein the effective use time of the at least one hydraulic element exceeds an actual use time of the at least one hydraulic element.

6. The work vehicle of claim 1, wherein the hydraulic management system further includes a gain input that communicates the second rate from an operator to the controller.

7. The work vehicle of claim 1, wherein the hydraulic management system further includes a tool selector input that identifies a selected one of the first and second hydraulic work tools to the controller.

8. The work vehicle of claim 1, wherein the at least one hydraulic element is in hydraulic communication with the first and second hydraulic work tools.

9. The work vehicle of claim 8, wherein the at least one hydraulic element includes a hydraulic fluid or a hydraulic filter.

10. The work vehicle of claim 1, wherein the work vehicle is an excavator.

11. The work vehicle of claim 1, wherein the first hydraulic work tool is a bucket.

12. The work vehicle of claim 1, wherein the second hydraulic work tool is one of a hammer, shears, an auger, a compactor, a grapple, a rake, and a wood splitter.

13. A work vehicle including:

a chassis;

a plurality of traction devices supporting the chassis;

at least one hydraulic work tool selectively coupled to the work vehicle for movement relative to the chassis; and a hydraulic management system including:

a controller; and a gain input that communicates a gain factor associated with the at least one hydraulic work tool to the controller, the controller multiplying usage of the at least one hydraulic work tool by the gain factor to determine an effective use time of at least one hydraulic element of the work vehicle.

14. The work vehicle of claim 13, wherein the gain factor ranges from 1 to 5.

15. The work vehicle of claim 13, wherein the hydraulic management system further includes a timer, the controller communicating with the timer to determine usage of the at least one hydraulic work tool.

16. The work vehicle of claim 13, further including a second hydraulic work tool selectively coupled to the work vehicle for movement relative to the chassis, wherein the gain input communicates a second gain factor associated with the second hydraulic work tool to the controller, the controller multiplying usage of the second hydraulic work tool by the second gain factor to determine the effective use time.

17. A method of managing a hydraulic system of a work vehicle, the method including the steps of:

receiving a gain factor associated with a hydraulic work tool;

operating the work vehicle with the hydraulic work tool coupled to the work vehicle;

monitoring an actual time of the operating step; and determining an effective use time of at least one hydraulic element of the work vehicle by multiplying the actual time of the operating step by the gain factor.

18. The method of claim 17, wherein the receiving step involves communicating with a gain input to manually receive the gain factor from an operator of the work vehicle.

19. The method of claim 17, wherein the operating step involves communicating with at least one tool operation input to move the hydraulic work tool.

20. The method of claim 17, wherein the monitoring step involves communicating with a timer.

21. The method of claim 17, further including the steps of:

receiving a second gain factor associated with a second hydraulic work tool, the second gain factor associated with the second hydraulic work tool differing from the gain factor associated with the hydraulic work tool;

operating the work vehicle with the second hydraulic work tool coupled to the work vehicle;

monitoring an actual time of the second operating step; and determining a combined effective use time of the at least one hydraulic element of the work vehicle by multiplying the actual time of the second operating step by the second gain factor and adding the effective use time of the first determining step.

22. The method of claim 17, further including the step of resetting the actual time after performance of a maintenance procedure.

* * * * *